United States Patent [19]
Orain

[11] 3,748,869
[45] July 31, 1973

[54] TRANSMISSION COUPLING WITH SPHERICAL ROLLER

[75] Inventor: Michel Orain, 78 Conflans Sainte-Honorine, France

[73] Assignee: Societe Anonyme: Glaenzer Spicer, Poissy, France

[22] Filed: Nov. 1, 1971

[21] Appl. No.: 194,648

[30]     Foreign Application Priority Data
Dec. 4, 1970   France ............................ 7043789

[52] U.S. Cl. ............................... 64/17 A, 308/236
[51] Int. Cl. ............................................. F16d 3/28
[58] Field of Search .................... 64/17 A, 17 R, 18; 308/236, 207

[56]         References Cited
             UNITED STATES PATENTS
1,943,814   1/1934   Cutting ............................ 64/17 A
3,145,547   8/1964   Lyons ............................... 64/17 A
2,802,351   8/1957   Anderson ......................... 64/17 A

*Primary Examiner*—Charles J. Myhre
*Assistant Examiner*—Randall Heald
*Attorney*—Donald M. Wight, Charles E. Brown et al.

[57]                ABSTRACT

This invention relates to a transmission coupling with a spherical roller. The spherical roller is pivotally mounted on a spindle with or without the interposition of pins for rolling movement in two opposed grooves formed in a jaw. The roller includes two half rollers symmetrical about a plane perpendicular to the spindle and including a great circle of the sphere formed by the roller. A resilient member which may be a Belleville washer or a ring of elastomeric material is interposed between the planar and parallel surfaces of the half rollers facing each other.

6 Claims, 8 Drawing Figures

PATENTED JUL 31 1973 3,748,869
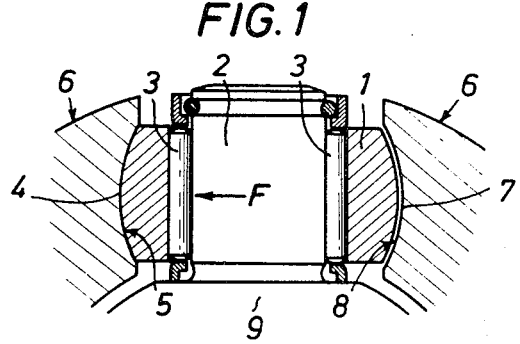
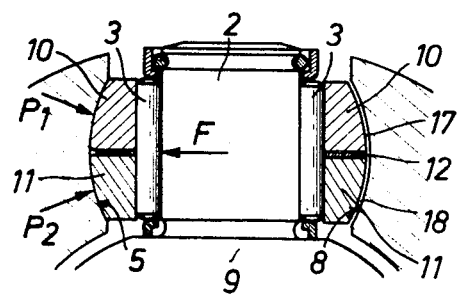
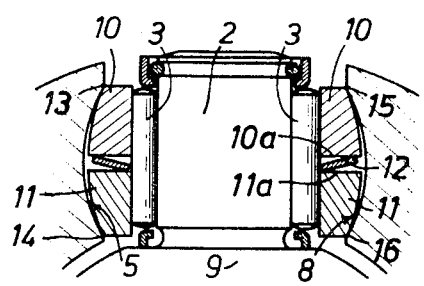
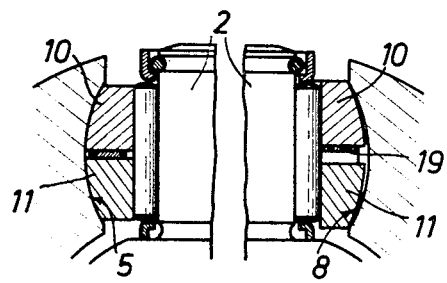
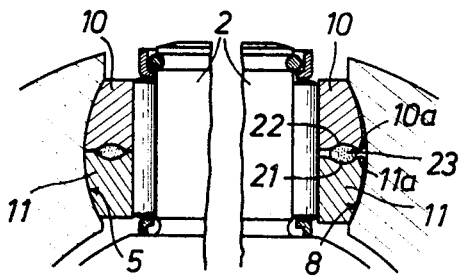
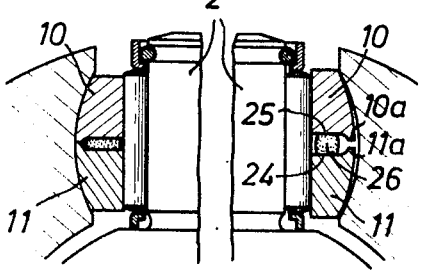

TRANSMISSION COUPLING WITH SPHERICAL ROLLER

The present invention relates to transmission couplings of the type comprising rollers pivoting on spindles with or without the interposition of pins and rolling along their outer spherical surfaces in pairs of opposed cylindrical grooves.

In this type of coupling or joint the torque is transmitted between the driving shaft fixed to the spindles and the driven shaft fixed with the jaw, in which the cylindrical grooves are formed through the intermediary of the roller. This torque is transmitted by forces which urge each roller against the opposed cylindrical groove according to the direction of the torque. In order that the rolling of the roller be effected under the best circumstances, a clearance is necessary between the opposite groove and the outer surface of the roller, since otherwise the displacement of the roller in the pair of grooves would be subject to a harmful resistance.

Further, this clearance is equal to the difference between the diameter of the cylinder inscribed in the two opposed grooves and the spherical diameter of the roller, and may cause the following drawbacks ;

1. angular play of the transmission which may cause jerks during the reversal of direction of the torque transmitted. In this case, contact is broken, for example between one of the grooves and the roller, and there is brutal contact between the other groove and the roller.

2. when the torque to be transmitted is nil, the roller-groove connection is not assured and if the jaw is mounted, for example, on a unit subject to intense vibrations, chattering or rattling due to a series of shocks between the rollers and grooves occurs.

An object of the present invention is precisely to provide an arrangement which does away with the disadvantages of the play necessary for the free sliding of the roller in the cylindrical grooves.

In this respect the invention consists in a transmission coupling of the spherical roller type pivoting on a spindle with or without the interposition of pins and rolling in two opposed cylindrical grooves, wherein the roller is split into two parts symmetrical about a plane containing a great circle perpendicular to the axis of the shaft and wherein a resilient member is interposed between the two surfaces facing the two half rollers.

The results of such an arrangement is that when the torque to be transmitted is nil or very small, the two half rollers are held apart from each other, the combination of the two half rollers being stopped between the edges of the two opposed grooves, which prevents any rattling or chattering between the rollers and grooves. On the other hand, when there is torque to be transmitted, the two half rollers come together while compressing the resilient member in such a manner that they maintain the outer surface of the two half rollers of the combination spherical.

According to a first embodiment, the surfaces of the two half rollers facing each other are planar and parallel and the resilient member under a predetermined compression force becomes substantially nondeformable and assures solid contact between the two half rollers in torque transmitting position.

According to a more elaborate embodiment, the resilient member is housed between two circular grooves in the surfaces facing the two half rollers which in torque transmission position are adapted to come into direct contact with each other through the intermediary of the edge(s) of the circular grooves.

Other features and advantages will be brought out in the following description of embodiments of the coupling according to the invention, the description being given merely by way of example with respect to the accompanying drawing, wherein :

FIG. 1 shows a view in axial section of a classic spherical coller coupling.

FIGS. 2 and 3 show two views in axial section of a coupling according to the invention in it rest and torque transmitting positions respectively.

FIG. 4 shows a view in axial section of another embodiment of the coupling according to the invention, the righthand part of the figure showing the rest position of the half rollers and the left-hand part showing the torque transmitting positions.

FIGS. 5 and 6 show elevation views of two resilient members for use in the coupling of FIG. 4;and FIGS. 7 and 8 show views similar to FIG. 4 but relative to two other embodiments.

The invention relates to a transmission coupling of the type shown in FIG. 1, that is with a spherical roller 1 pivoting on a spindle 2 with (or without) the interposition of pins and rolling along its outer surface 4 in two cylindrical grooves 5 and 8 formed opposite thereto in a jaw 6.

In such a coupling the torque is transmitted between the driving shaft 9 fixed to the spindle 2 and the driven shaft (not shown) fixed to the jaw 6 through the intermediary of the roller 1 and the pins 3, if any.

This torque is represented by forces F, which the roller 1 applies at 4 against the groove 5. In order that the rolling of the roller 1 be effected under the best conditions, a clearance between the opposite groove 8 and roller is essential.

The clearance 7, which is equal to the difference between the diameter of the cylinder defined between the two grooves 5 and 8 and the outer diameter of the roller 1, could be the cause of the following drawbacks :

1. Angular play of the transmission, which may cause jerks during the reversal of the direction of the torque transmitted. In this case the contact is broken, for example between the groove 5 and the roller 1, and there is a brutal breaking of contact between the other groove 8 and the roller 1.

2. when the torque to be transmitted is nil, the connection roller : groove is not assured and, if the jaw 6 is mounted for example on a unit subject to intense vibrations, chattering or rattling due to a series of shocks between the roller 1 and the grooves 5 and 8 is produced.

According to the invention, the roller 1 is (FIG. 2) divided into two half rollers 10 and 11, symmetrical along the plan of the great circle perpendicular to the spindle 2, and a resilient member 12 is interposed between the surfaces 10a and 11a facing the half rollers 10 and 11.

In the embodiment shown in FIGS. 2 and 3, the surfaces 10a and 11a are planar and parallel and the resilient member 12 is formed by one or more Belleville washers. When no torque is being transmitted, said member 12 maintains the two half rollers 10 and 11 apart, while the edges 13,14 and 15,16 of the grooves 5 and 8 respectively maintain the half rollers in the grooves.

When torque is transmitted by the coupling, a corresponding force F is applied by the spindle 2 (FIG. 3) against the half rollers 10, 11 which bear against the groove 5. The resultants $P_1$ and $P_2$ of the pressures developed along the contact zone of the half rollers with the groove 5 are inclined on the plane of the great circles common to the two half rollers and tend to move them together, compressing the resilient member 12. Thus, the clearance reappears at 17 and 18 between the half rollers and the groove 8 permitting the proper rolling of the two half rollers with a load on the groove 5 and without frictional contact with the groove 8.

With reference to FIGS. 2 and 3, it can be seen that, as the torque to be transmitted increases, the resilient member, in this case the Belleville washer(s), are compressed up to the point that the member 12 becomes nondeformable (FIG. 3) and assures the solid contact between the two half rollers 10 and 11.

FIGS. 4, 5 and 6 show various embodiments of the member 12 in FIGS. 2 and 3. The resilient member 12 may be formed by a corrugated washer of various types 19 or 20 (FIGS. 5 and 6). The left- and right-hand portions of FIG. 4 show the washer 19 in rest and flattened positions respectively during the transmission of the torque.

FIG. 7 shows another embodiment, wherein the surfaces 10a and 11a facing the half rollers 10 and 11 comprise two opposed circular symmetrical rollers 21, 22.

The closed ends of the grooves 21 and 22 are rounded in order to accommodate a toroidal of elastomeric material, for example, forming the resilient member.

In rest position (right-hand portion of FIG. 7) the ring 23 is interposed between the half rollers and is very slightly compressed.

During the tranmission of torque (left-hand portion of FIG. 7) the ring 23 is partially flattened and the nonhollow portions of the surfaces 10a and 11a come into contact so as to assure direct solid contact between the half rollers.

Further in this embodiment the position of the half rollers 10 and 11 relative to the jaw 6 in rest position as well as during the transmission of torque is strictly the same as in the coupling in FIGS. 2 and 3.

Finally, FIG. 8 shows another embodiment in which the surfaces 10a and 11a facing the half rollers comprise circular grooves 24 and 25 with flat closed ends enabling the accommodation of a ring with a rectangular section for example of expanded or cellular elastomeric material.

In rest position (right-hand portion of FIG. 8) the ring 26 is interposed between the half rollers and very slightly compressed.

During the transmission of torque (left-hand portion of FIG. 8), the ring 26 is partially flattened and fills substantially the space delimited between the half rollers by the grooves 24 and 25, while the portions of the nonhollow surfaces 10a and 11a come into contact so as to assure a rigid direct contact between the half rollers.

The present invention is, of course, not limited to embodiments shown and described hereinbefore but, on the contrary, covers all embodiments, equivalents and variations, namely those concerning the nature and the shape of the resilient member as well as those concerning the configuration of the surfaces for accomodating the resilient member.

What is claimed is :

1. A transmission coupling, comprising a spherically shaped roller mounted for rotation on a spindle, two opposed part cylindrical elongated grooves for receiving the roller for rolling movement therein, said roller including two half rollers arranged substantially symmetrical about a plane perpendicular to the spindle containing a great circle of the sphere and formed by the roller, said half rollers having spaced opposed surfaces and a resilient member interposed between said opposed surfaces of said half rollers and urging said half rollers apart.

2. A transmission coupling according to claim 1, wherein said opposed surfaces of the half rollers are planar and parallel to each other, and wherein the resilient member is of the type which becomes substantially nondeformable upon the application of a predetermined compression force, thereby assuring a solid connection between the two half rollers in their torque transmitting position.

3. A transmission coupling according to claim 2, wherein the resilient member comprises at least one Belleville washer.

4. A transmission coupling according to claim 2, wherein the resilient member comprises at least one corrugated washer.

5. A transmission coupling according to claim 1, wherein the resilient member is received in two circular grooves formed in said opposed surfaces of the two half rollers, said resilient member being fully seatable in said circular grooves and allowing said half rollers to come into direct contact with each other in their torque transmitting position.

6. A transmission coupling according to claim 5, wherein the resilient member comprises a ring of elastomeric material.

* * * * *